(12) United States Patent
Gaillard et al.

(10) Patent No.: US 12,123,320 B2
(45) Date of Patent: Oct. 22, 2024

(54) TURBOMACHINE STATOR ASSEMBLY COMPRISING AN INNER SHROUD HAVING UPSTREAM AND DOWNSTREAM PORTIONS ASSEMBLED BY AXIAL TRANSLATION

(71) Applicant: SAFRAN AIRCRAFT ENGINES, Paris (FR)

(72) Inventors: Aurelien Gaillard, Moissy-Cramayel (FR); Sebastien Serge Francis Congratel, Moissy-Cramayel (FR); Clement Jarrossay, Moissy-Cramayel (FR); Pascal Cedric Tabarin, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 6 days.

(21) Appl. No.: 17/758,893

(22) PCT Filed: Jan. 14, 2021

(86) PCT No.: PCT/FR2021/050063
§ 371 (c)(1),
(2) Date: Jul. 15, 2022

(87) PCT Pub. No.: WO2021/148739
PCT Pub. Date: Jul. 29, 2021

(65) Prior Publication Data
US 2023/0051167 A1    Feb. 16, 2023

(30) Foreign Application Priority Data
Jan. 23, 2020 (FR) .................................. 2000640

(51) Int. Cl.
*F01D 5/22* (2006.01)
*F01D 11/00* (2006.01)
*F01D 25/28* (2006.01)

(52) U.S. Cl.
CPC ............ *F01D 5/225* (2013.01); *F01D 11/006* (2013.01); *F01D 25/28* (2013.01);
(Continued)

(58) Field of Classification Search
CPC ..... F01D 5/225; F01D 11/122; F05D 2240/80
See application file for complete search history.

(56) References Cited

U.S. PATENT DOCUMENTS

| 4,113,406 A | * | 9/1978 | Lee | ........................... F01D 5/08 |
| | | | | 415/115 |
| 11,313,233 B2 | * | 4/2022 | Vetters | ..................... F01D 5/147 |

(Continued)

FOREIGN PATENT DOCUMENTS

| FR | 2 979 662 A1 | 3/2013 |
| FR | 3055656 A1 | * 3/2018 ........... F01D 25/162 |

OTHER PUBLICATIONS

International Search Report issued Jun. 11, 2021 in PCT/FR2021/050063, filed on Jan. 14, 2021, 2 pages.
(Continued)

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

A stator wheel for a turbomachine turbine. This wheel includes an inner shroud formed by an upstream portion and a downstream portion configured to be assembled with the blades by axial translation in a respective direction.

12 Claims, 7 Drawing Sheets

(52) U.S. Cl.
CPC ...... *F05D 2240/11* (2013.01); *F05D 2240/80* (2013.01); *F05D 2260/31* (2013.01); *F05D 2300/6033* (2013.01)

(56) References Cited

U.S. PATENT DOCUMENTS

2014/0004293 A1\* 1/2014 Grooms, II ............. F01D 5/284
  428/99
2014/0227088 A1   8/2014 Beaujard et al.

OTHER PUBLICATIONS

French Preliminary Search Report issued Jul. 8, 2020 in French Application 20 00640, filed on Jan. 23, 2020, 2 pages (with English translation of Categories of Cited Documents).

\* cited by examiner

TURBOMACHINE STATOR ASSEMBLY COMPRISING AN INNER SHROUD HAVING UPSTREAM AND DOWNSTREAM PORTIONS ASSEMBLED BY AXIAL TRANSLATION

TECHNICAL FIELD

The invention relates to the field of turbomachines, in particular for an aircraft propulsion assembly, and more specifically relates to a stator assembly which comprises a turbine distributor or a compressor rectifier of such a turbomachine.

The invention is of particular, non-limiting interest for turbomachines equipped with bladed stator made of composite material with a ceramic matrix.

PRIOR ART

A ceramic matrix composite material, hereinafter referred to as "CMC material" or "CMC", generally comprises a fibrous reinforcement and a ceramic, or partially ceramic matrix. A CMC is a thermo-structural composite capable of withstanding relatively high thermal stresses and having a relatively low density, in particular lower than that of metal materials conventionally used to produce turbomachine turbine components.

In the aeronautical field, it has been proposed to produce the blades of turbine assemblies in CMC. For example, document FR 2 979 662 describes a turbine distributor comprising CMC stator blades. Such a distributor allows to reduce the quantity of ventilation air used compared to a distributor with metal blades, which allows to improve the performance of the turbomachine.

Generally, such a stator assembly comprises an inner shroud and an outer shroud between which the blades extend radially.

Several approaches have been developed to implement CMC blades in a turbomachine turbine.

According to a first approach, the inner shroud, the outer shroud and the blades are designed to be assembled prior to their integration within the turbine. This approach is generally not compatible with the architecture of a conventional turbine given the space available between the portions of the rotor receiving such stator assemblies. The mounting of such a wheel may require modifying the architecture of the turbine.

According to a second approach, the inner shroud is produced in several ring sectors designed to each be able to be fitted radially on a respective portion of the blades previously mounted with the outer shroud within the turbine. This approach allows to assemble the stator assembly within a conventional turbine. However, there is a need to simplify the mounting of the inner shroud.

DESCRIPTION OF INVENTION

A purpose of the invention is to provide a stator assembly for a turbine distributor or for a turbomachine compressor rectifier allowing or facilitating its mounting in the turbomachine.

Another purpose of the invention is to ensure good sealing of the ventilation circuit passing through this assembly.

Another purpose of the invention is to allow the integration of such an assembly within a conventional turbomachine.

To this end, the invention relates to a stator assembly for a turbomachine having a central longitudinal axis and comprising an outer shroud extending around said central longitudinal axis, an inner shroud concentric with the outer shroud and a blade extending radially between the inner shroud and the outer shroud, the blade being connected to the inner shroud via a first connecting means, the blade delimiting a channel configured to convey ventilation air from a cavity extending radially outside the outer shroud to a cavity extending radially inside the inner shroud.

According to the invention, the inner shroud comprises an upstream portion and a downstream portion forming two parts separate from each other and extending respectively from an axially upstream side and from an axially downstream side of said first connecting means when said parts are in an assembled configuration, the upstream portion being configured to be placed, when assembling the inner shroud, in the assembled configuration by axial translation of this upstream portion relative to the blade in a first direction extending from said upstream side to said downstream side, the downstream portion being configured to be placed, when assembling the inner shroud, in the assembled configuration by axial translation of this downstream portion relative to the blade in a second direction extending from said downstream side to said upstream side, the assembly comprising second connecting means connecting the upstream portion and the downstream portion of the inner shroud to each other so as to maintain them in said assembled configuration.

The production of the inner shroud in upstream and downstream portions facilitates the assemblage of the assembly and allows it to be assembled within a conventional turbomachine.

Preferably, the upstream portion and/or the downstream portion of the inner shroud are annular.

More preferably, both the upstream portion is an annular portion and the downstream portion is an annular portion.

The expression "annular portion" designates a portion comprising a circumferentially closed perimeter, that is to say a continuous structure over two pi radians. In other words, each of the upstream and downstream annular portions forms a part of revolution around said central longitudinal axis of the stator assembly.

Unlike the inner shroud of a conventional stator assembly, the inner shroud of the invention is not made in ring sectors but comprises several annular portions, which allows this inner shroud to be mounted in the last step, that is to say after mounting the outer shroud on a casing of the turbomachine and assembling the blades with the outer shroud.

The upstream and downstream portions of the inner shroud being annular, this also results in improved sealing in the radially inner portion of the stator assembly.

In one embodiment, the assembly comprises a first sealing member integral with an upstream end of a radially inner platform of the blade and a second sealing member integral with a downstream end of the radially inner platform of the blade, the upstream portion of the inner shroud comprising a sealing face axially bearing on the first sealing member, the downstream portion of the inner shroud comprising a sealing face axially bearing on the second sealing member.

Such sealing members and such cooperation thereof with the upstream and downstream portions of the inner shroud allow to further improve the sealing in the radially inner portion of the stator assembly while simplifying the assemblage of the stator assembly.

In the context of such an embodiment, it is preferred that each of the first and the second sealing member is a sealing tab extending circumferentially around the central longitudinal axis and having a radially outer portion housed in a respective groove of the radially inner platform of the blade and a radially inner portion forming a bearing face for said sealing face of the upstream and downstream portion respectively.

In one embodiment, the second connecting means comprise bolts.

In general, such connecting means are preferably configured to apply a force to hold the upstream portion and the downstream portion of the inner shroud relative to each other. This holding force can be oriented axially and/or radially.

For this purpose, the second connecting means can each extend either axially or radially.

In one embodiment, the inner shroud comprises a connecting portion cooperating with a connecting portion of the blade, the first connecting means passing through the connecting portion of the inner shroud and the connecting portion of the blade so as to connect the inner shroud and the blade to each other.

According to a first variant, the connecting portion of the inner shroud is formed by a radial arm of the upstream portion of this inner shroud.

According to a second variant, the connecting portion of the inner shroud is formed by a radial arm of the downstream portion of this inner shroud.

According to a third variant, the inner shroud comprises an intermediate portion forming a part separate from each of the upstream and downstream portions, this intermediate portion being fixed to the upstream and downstream portions when the latter are in said assembled configuration, the connecting portion of the inner shroud being formed by a radial arm of the intermediate portion of this inner shroud.

In a preferred embodiment, the inner shroud and the outer shroud each comprise a metal material and the at least one blade comprises a ceramic matrix composite material.

The invention also relates to a module such as a turbine or a turbomachine compressor, this module comprising an assembly as defined above.

The invention also relates to a turbomachine comprising such a module.

The invention covers a fortiori an aircraft propulsion assembly comprising such a turbomachine as well as an aircraft comprising such a propulsion assembly.

Finally, the invention relates to a method for assembling an assembly as defined above.

According to the invention, this method comprises a first step of assembling the blade with the outer shroud and a second step of assembling the inner shroud with the blade assembled with the outer shroud during the first step, the second step comprising an axial translation of the upstream portion in said first direction and an axial translation of the downstream portion in said second direction.

Such a method allows in particular to facilitate the assemblage of the stator assembly within the turbomachine, in particular when the latter has a conventional architecture.

Other advantages and features of the invention will appear upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

The figures comprise a reference frame L, R and C respectively defining longitudinal, radial and circumferential directions orthogonal to each other.

Figure 1:
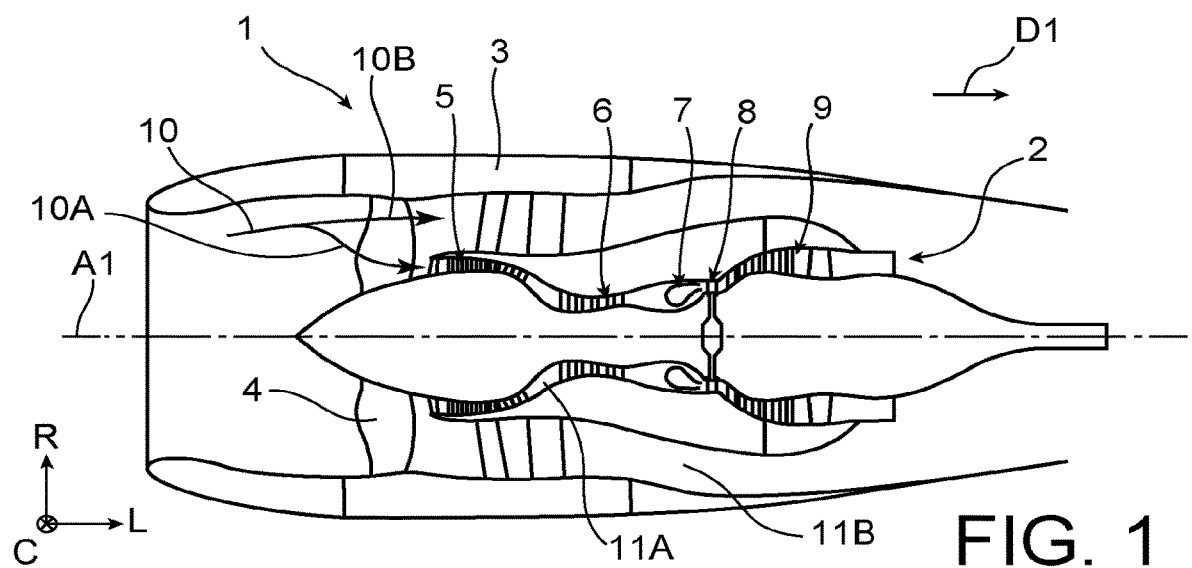
FIG. 1 is a schematic view in axial section of an aircraft propulsion assembly in accordance with the invention.

FIG. 1 shows an aircraft propulsion assembly 1 comprising a turbomachine 2 shrouded by a nacelle 3. In this example, the turbomachine 2 is a two-spool turbojet engine.

Subsequently, the terms "upstream" and "downstream" are defined relative to a direction D1 of gas flow through the propulsion assembly 1 when the latter is propelled. The direction of flow D1 is parallel to the longitudinal direction L.

The turbojet engine 2 has a central longitudinal axis A1 around which its various components extend, in this case, from upstream to downstream of the turbojet engine 2, a fan 4, a low pressure compressor 5, a high pressure compressor 6, a combustion chamber 7, a high pressure turbine 8 and a low pressure turbine 9. In other words, these various components extend along the circumferential direction C. The compressors 5 and 6, the combustion chamber 7 and the turbines 8 and 9 form a gas generator.

During operation of the turbojet engine 2, an air flow 10 enters the propulsion assembly 1 via an air inlet upstream of the nacelle 3, passes through the fan 4 and then divides into a central primary flow 10A and a secondary flow 10B. The primary flow 10A flows in a main flow path 11A for the circulation of gases passing through the compressors 5 and 6, the combustion chamber 7 and the turbines 8 and 9. The secondary flow 10B in turn flows in a secondary flow path 11B surrounding the gas generator and delimited radially outwards by the nacelle 3.

In a manner known per se, a turbine such as the high pressure turbine 8 or the low pressure turbine 9 includes one or more stages, each stage comprising a distributor and a movable wheel. The distributor of a stage comprises a crown of stator blades configured to divert the primary flow 10A coming from the combustion chamber 7 towards the blades of the movable wheel of the same stage so as to rotate this movable wheel. For each of the turbines 8 and 9, the distributor(s) form a stator of the turbine, while the movable wheel(s) form a rotor of the turbine.

The invention relates more specifically to a stator assembly forming in this example a distributor 20 belonging to the first stage of the low pressure turbine 9. Of course, one or more other stages of the low pressure turbine 9 and/or of the high pressure turbine 8 may comprise a distributor 20 as described below. Furthermore, the compressors 5 and/or 6 may comprise a rectifier similar to the distributor 20 described below.

Figure 2:
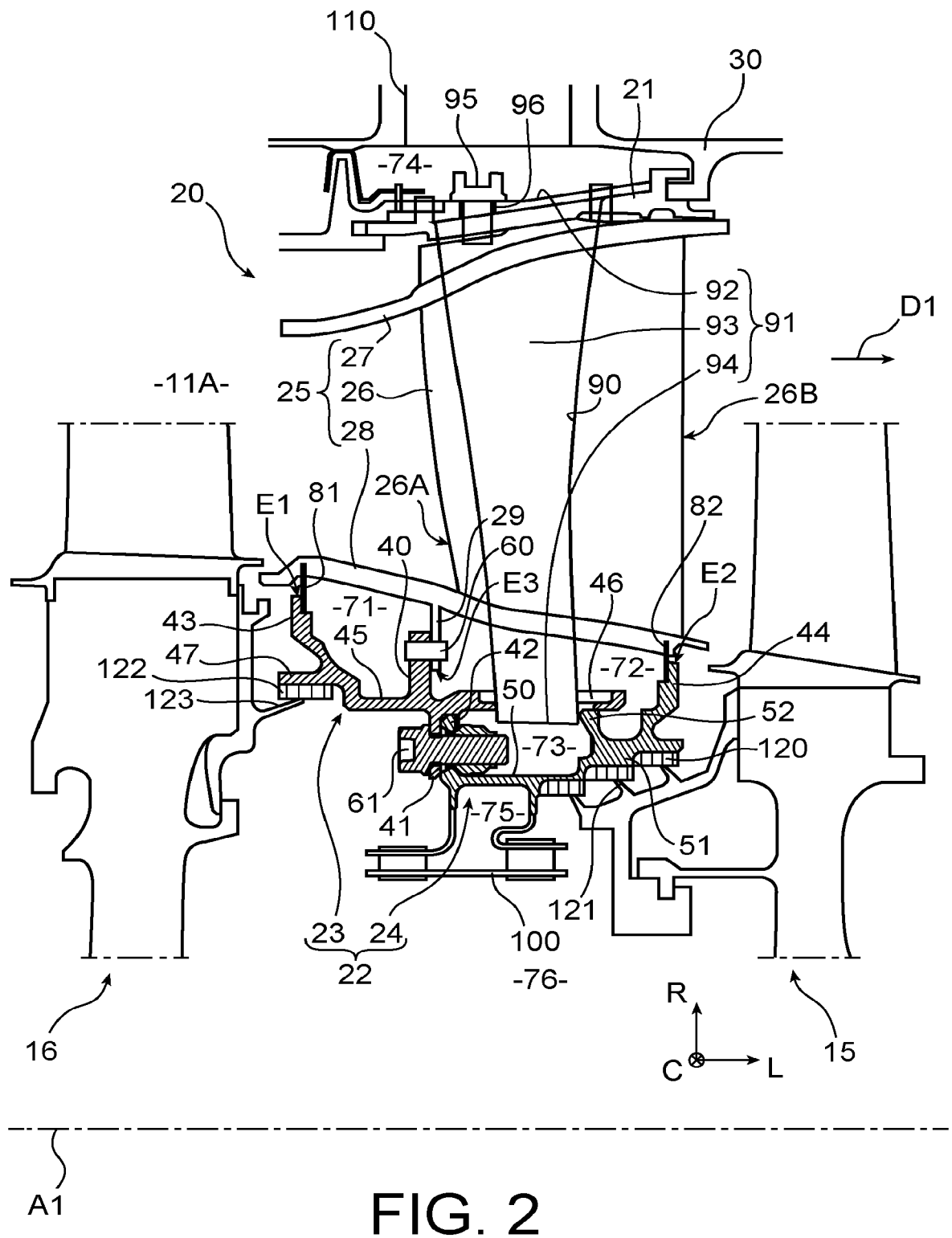
FIG. 2 is a schematic half-view in axial section of a turbine portion comprising a distributor, a movable wheel upstream of the distributor and a movable wheel downstream of the distributor, the distributor comprising an inner shroud in accordance with a first embodiment of the invention.

With reference to FIG. 2, the distributor 20 has a central longitudinal axis which coincides with the axis A1 of the turbojet engine 2. In this respect, the longitudinal direction L is also called the axial direction.

The distributor 20 comprises a radially outer shroud 21, also called "outer shroud" and a radially inner shroud 22, also called "inner shroud".

The inner shroud 22 comprises an upstream portion 23 and a downstream portion 24 forming two parts separate from each other.

In this example, the upstream portion 23 and the downstream portion 24 are both annular.

The outer shroud 21, the upstream portion 23 of the inner shroud 22 and the downstream portion 24 of the inner shroud 22 each form a part which extends circumferentially around the central axis A1 parallel to the longitudinal direction L. These parts are substantially concentric and preferably annular.

The upstream portion 23 and the downstream portion 24 of the inner shroud 22 each extend radially inside the outer shroud 21.

In this example, the outer shroud 21 is fixedly mounted to a casing 30 of the turbine 9, the casing 30 and the distributor 20 both belonging to the stator of the turbine 9.

The outer shroud 21, the upstream portion 23 of the inner shroud 22, the downstream portion 24 of the inner shroud 22 and the casing 30 are made of a material allowing them to withstand relatively high mechanical and thermal stresses, in this example a metal material, for example based on nickel or cobalt.

The distributor 20 also comprises a plurality of blades 25 made of ceramic matrix composite material (hereinafter "CMC") which follow one another circumferentially around the axis A1.

FIG. 2 shows a single blade 25. The following description refers to this blade 25, it being understood that the other blades, not shown in this figure, are in this example identical to this blade 25.

In a manner known per se, the blade 25 comprises a vane 26, a radially outer platform 27, also called "outer platform", and a radially inner platform 28 also called "inner platform".

The vane 26 comprises a leading edge 26A and a trailing edge 26B configured to direct the primary flow 10A coming from the combustion chamber 7 on the blades of a movable wheel 15 located downstream of the distributor 20.

The distributor 20 and the movable wheel 15 belong in this example to the same stage of the turbine 9. FIG. 2 also shows a movable wheel 16 upstream of the distributor 20, this movable wheel 16 belonging in this example to the high pressure turbine 8.

The blade 25 of the distributor 20 extends radially between the outer shroud 21 and the inner shroud 22 so that the vane 26 extends through the primary flow path 11A.

The inner platform 28 of the blade 25 comprises a radial arm 29 forming a connecting portion intended to connect this blade 25 to the inner shroud 22.

In this example, the inner shroud 22 comprises a radial arm 40 forming a corresponding connecting portion.

The radial arm 40 is integral with the upstream portion 23 of the inner shroud 22. In an embodiment not shown, the connecting portion of the inner shroud 22 is a radial arm integral with the downstream portion 24 of the inner shroud 22.

In the configuration of FIG. 2, called "assembled configuration", the radial arms 29 and 40 are axially facing each other and each comprise a housing receiving a connecting means 60.

More specifically, for each of the radial arms 29 and 40, the corresponding housing is formed by an orifice passing right through this radial arm in the longitudinal direction L so as to open on the one hand onto an upstream face and on the other hand onto a downstream face of this radial arm.

In the assembled configuration, the housing of the radial arm 29 and that of the radial arm 40 are aligned axially relative to each other and maintained substantially aligned by said connecting means 60.

In this example, the connecting means 60 is a pin received on the one hand in the housing of the radial arm 29 and on the other hand in the housing of the radial arm 40.

The pin 60 is in this case mounted with a clearance in the housing of the radial arm 29 to allow expansion of this pin 60 during the operation of the turbomachine 2. Indeed, the pin 60 is in this example made of a metal material while the blade 25 and in particular the radial arm 29 of its inner platform 28 are made of CMC resulting in differential thermal expansion of these elements.

Thus, the radial arms 29 and 40 cooperate so as to connect, via the pin 60, the blade 25 and the upstream portion 23 of the inner shroud 22 to each other.

The inner shroud 22 further comprises two connecting portions 41 and 42 respectively integral with the upstream portion 23 and the downstream portion 24 of this inner shroud 22 in order to connect these upstream 23 and downstream 24 portions to one another.

In this example, for each of the connecting portions 41 and 42, this connecting portion forms a radial arm comprising an orifice passing right through this radial arm in the longitudinal direction L so as to open on the one hand on an upstream face and on the other hand on a downstream face of this radial arm.

In the assembled configuration, the radial arm 41 of the upstream portion 23 extends opposite the radial arm 42 of the downstream portion 24 so that the orifice of the radial arm 41 is substantially aligned with that of the radial arm 42.

A connecting means 61 such as a bolt passes through these orifices to hold the radial arms 41 and 42 against each other and thus hold the upstream portion 23 and the downstream portion 24 in the assembled configuration.

The inner shroud 22 moreover comprises an upstream radial arm 43 integral with the upstream portion 23 and a downstream radial arm 44 integral with the downstream portion 24.

On the one hand, the upstream radial arm 43 and the radial arm 40 of the upstream portion 23 longitudinally delimit therebetween a first inner space 71 of the inner shroud 22. This first inner space 71 is delimited radially inwards by a longitudinal section 45 of the upstream portion 23, this longitudinal section 45 connecting the radial arms 40 and 43 to each other. This first inner space 71 is delimited radially outwards by the inner platform 28 of the blade 25.

To prevent the introduction, within this first inner space 71, of hot gases circulating in the primary flow path 11A, the distributor 20 comprises a first sealing member 81 extending between the upstream radial arm 43 and the inner platform 28 of the blade 25.

In this example, the first sealing member 81 comprises an annular tab extending circumferentially around the axis A1. This tab 81 is split to facilitate the mounting.

In another embodiment not shown, the first sealing member 81 comprises several tabs extending circumferentially around the axis A1 and placed circumferentially end to end so as to form together an annular sealing member.

The inner platform 28 of the blade 25 comprises, at an upstream end of this platform, a first groove. In the assembled configuration, this first groove receives a radially outer portion of the first sealing member 81.

The upstream radial arm 43 comprises a slot forming a face called sealing face. In the assembled configuration, this sealing face bears axially on a face called bearing face formed by a radially inner portion of the first sealing member 81 (see FIG. 2).

On the other hand, when the upstream portion 23 and the downstream portion 24 of the inner shroud 22 are assembled with each other according to the configuration of FIG. 2, the radial arm 40 of the upstream portion 23 and the downstream radial arm 44 of the downstream portion 24 longitudinally delimit therebetween a second inner space 72 of the inner shroud 22. This second inner space 72 is delimited radially inwards by a longitudinal section 46 of the upstream portion 23 which extends longitudinally downstream of the radial arm 40 and by a downstream section 51 of the downstream portion 24. This second inner space 72 is delimited radially outwards by the inner platform 28 of the blade 25.

To prevent the introduction, within this second inner space 72, of hot gases circulating in the primary flow path 11A, the distributor 20 comprises a second sealing member 82 extending between the downstream radial arm 44 and the inner platform 28 of the blade 25.

The second sealing member 82 is similar to the first sealing member 81 and comprises in this example a split annular tab extending circumferentially around the axis A1.

Alternatively, the first sealing member 81 may comprise several tabs placed circumferentially end to end so as to form an annular sealing member.

The inner platform 28 of the blade 25 comprises, at a downstream end of this platform, a second groove. In the assembled configuration, this second groove receives a radially outer portion of the second sealing member 82.

The downstream radial arm 44 comprises a slot forming a sealing face. In the assembled configuration, this sealing face bears axially on a bearing face formed by a radially inner portion of the second sealing member 82.

The slots of the upstream 43 and downstream 44 radial arms which have just been described thus form half-housings for the first and the second sealing member 81 and 82, respectively, allowing mounting by axial translation, that is to say along the longitudinal direction L, of the upstream 23 and downstream 24 portions of the inner shroud 22 when assembling the distributor 20 (see further below).

The geometry of the upstream 23 and downstream 24 portions of the inner shroud 22 will now be described more precisely with reference to FIG. 2.

The longitudinal sections 45 and 46 of the upstream portion 23 extend substantially parallel to the axis A1 at the same radial coordinate R.

The upstream radial arm 43 extends radially outwards from an upstream end of the longitudinal section 45. The radial arm 40 extends radially outwards from a downstream end of the longitudinal section 45 and from an upstream end of the longitudinal section 46. The radial arm 41 extends radially inwards from the downstream end of the longitudinal section 45 and from the upstream end of the longitudinal section 46.

The downstream portion 24 comprises a longitudinal section 50. The radial arm 42 extends radially outwards from an upstream end of this longitudinal section 50.

The downstream portion 24 moreover comprises the aforementioned section 51, this section 51 forming steps and extending downstream and radially outwards from a downstream end of the longitudinal section 50. The radial arm 44 extends radially outwards from a downstream end of this section 51.

The downstream portion 24 also comprises a bearing arm 52 extending radially outwards from an intermediate portion of the section 51.

In the assembled configuration, the arms 42 and 52 as well as the sections 50 and 51 of the downstream portion 24 extend radially inside the longitudinal section 46 of the upstream portion 23. A downstream end of the longitudinal section 46 of the upstream portion 23 bears radially on the support arm 52 of the downstream portion 24.

The radial arm 42 and the support arm 52 of the downstream portion 24 longitudinally delimit therebetween a third inner space 73 of the inner shroud 22. This third inner space 73 is delimited radially inwards by the longitudinal section 50 of the downstream portion 24 and radially outwards by the longitudinal section 46 of the upstream portion 23.

More generally, in the assembled configuration, the downstream portion 24 extends completely downstream from the radial arm 41 of the upstream portion 23 and downstream from the radial arm 29 of the blade 25. The radial arms 40 and 43 as well as the longitudinal section 45 of the upstream portion 23 extend upstream of the radial arm 29 of the blade 25 while the longitudinal section 46 of the upstream portion 23 extends downstream of the radial arm 29 of the blade 25. The radial arm 41 of the upstream portion 23 is substantially aligned with the radial arm 29 of the blade 25 in the radial direction R.

In this example, each of the upstream 43 and downstream 44 radial arms of the inner shroud 22 has a radially outer apex E1/E2 located radially beyond a radially inner apex E3 of the radial arm 29 of the blade 25 when the latter it is mounted on the outer shroud 21.

The invention nevertheless allows to assemble the inner shroud 22 with the blade 25 by axial translation of the upstream 23 and downstream 24 portions of this inner shroud 22 in a respective direction.

An assemblage sequence is described below with reference to FIGS. 3 to 7 which show different portions of a distributor 20 whose lower portion—including the inner shroud 22, the first sealing member 81, the second sealing 82 member, as well as the radial arm 29 and the inner platform 28 of the blade 25—is similar to that of the distributor 20 of FIG. 2.

Figure 4:
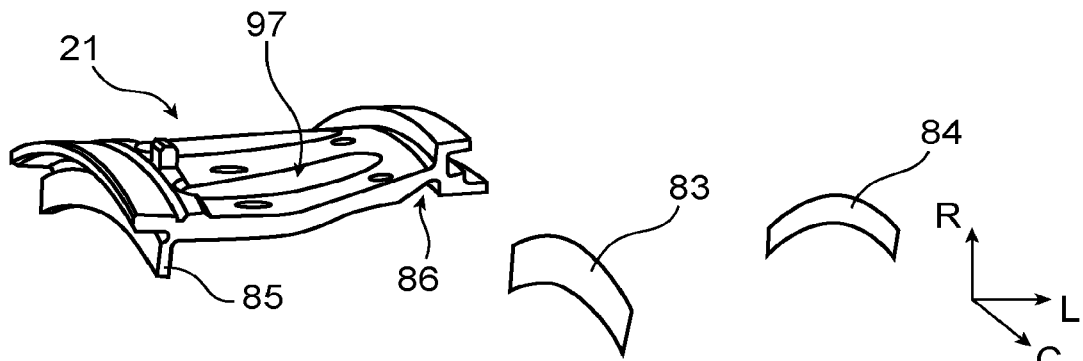
FIG. 4 is a schematic perspective and exploded view of circumferential sections of an outer shroud and sealing members of the distributor of FIG. 3.

FIG. 4 shows an outer shroud 21 and two sealing members 83 and 84 similar to the sealing members 81 and 82. The sealing members 83 and 84 are intended to seal a radially outer portion of the distributor 20.

In this example, the outer shroud 21 comprises a lip 85 forming an upstream sealing face and a slot 86 forming a downstream sealing face.

Figure 5:
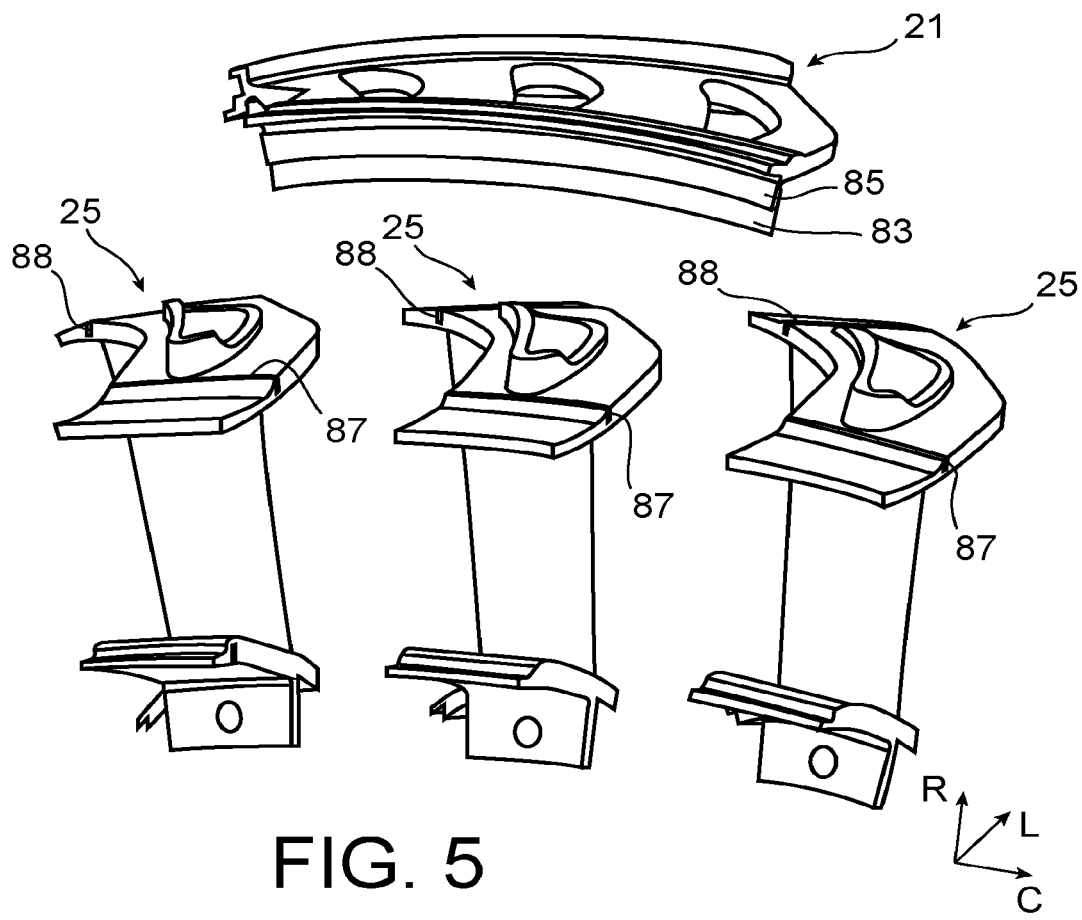
FIG. 5 is a schematic perspective view of a portion of the distributor of FIG. 3, this portion comprising on the one hand the elements of FIG. 4 assembled with each other and, on the other hand, three blades shown unassembled with the outer shroud.

To switch from the configuration of FIG. 4 to that of FIG. 5, a radially outer end of the sealing member 83 is placed against the lip 85, bearing on said upstream sealing face of the outer shroud 21. A radially outer end of the sealing member 84 is placed within the slot 86, resting on said downstream sealing face of the outer shroud 21.

Figure 6:
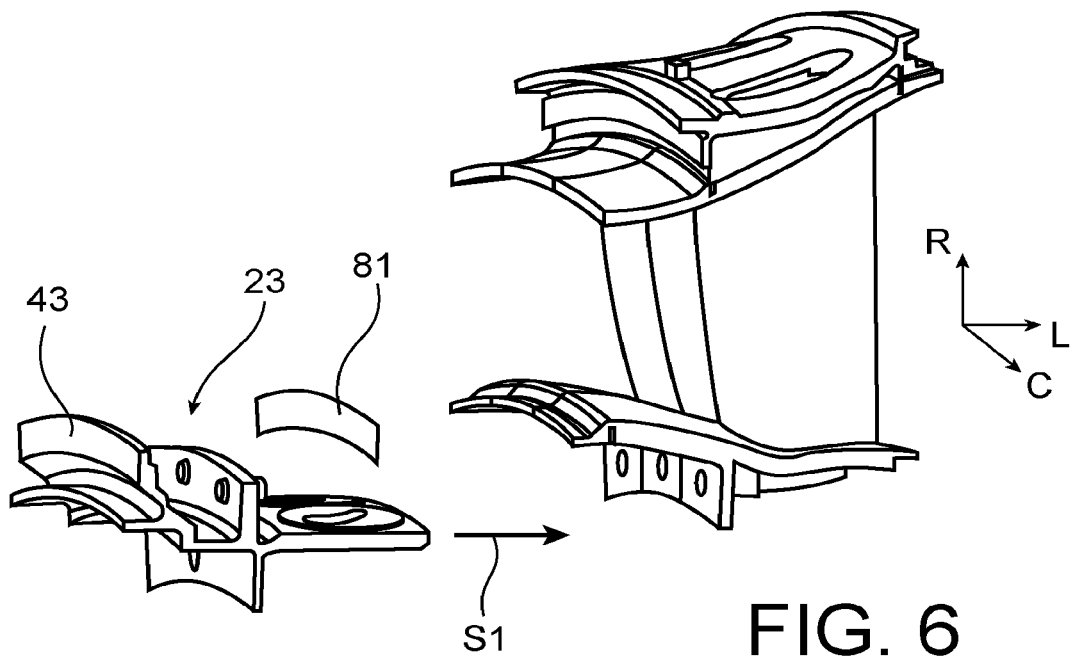
FIG. 6 is a schematic perspective view of a portion of the distributor of FIG. 3, this portion comprising on the one hand the elements of FIG. 5 assembled with each other and, on the other hand, a circumferential section of an upstream portion of an inner shroud of the distributor as well as a circumferential section of an upstream lower sealing member shown unassembled with the blades.

To switch from the configuration of FIG. 5 to that of FIG. 6, the blades 25 represented here three in number are pressed radially against the outer shroud 21 so that a radially inner end of the sealing members 83 and 84 penetrates in a respective one of the grooves 87 and 88 made in each of the blades 25.

Figure 7:
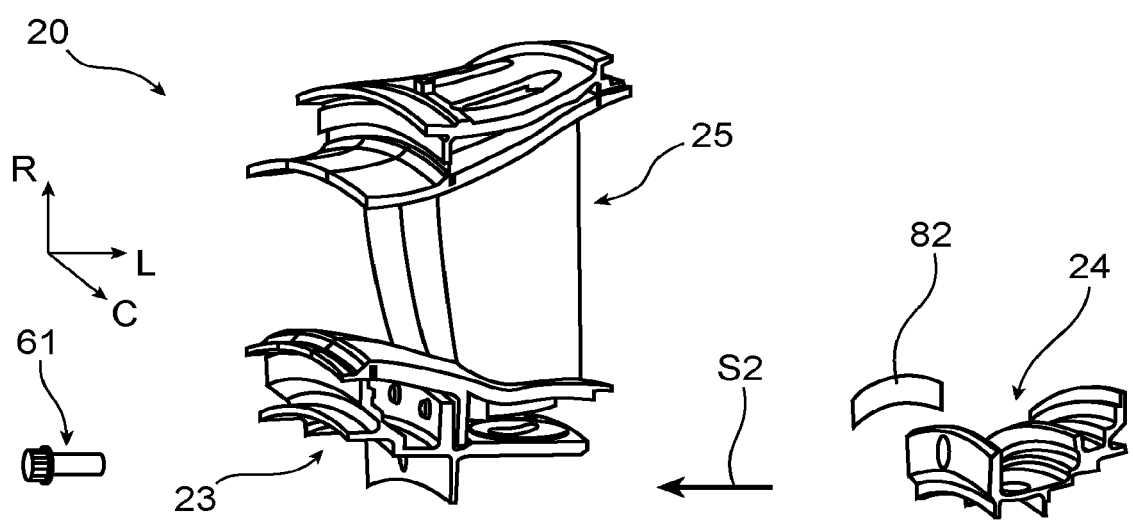
FIG. 7 is a schematic perspective view of a portion of the distributor of FIG. 3, this portion comprising on the one hand the elements of FIG. 6 assembled with each other and, on the other hand, a circumferential section of a downstream portion of the inner shroud as well as a circumferential section of another downstream lower sealing member shown unassembled with the blades and with the upstream portion of the inner shroud.

From the configuration of FIG. 6, the first sealing member 81 is positioned in said first groove of the blades 25 and the upstream portion 23 of the inner shroud 22 is moved by axial translation relative to the blades 25 in a first direction S1 from upstream to downstream to reach the configuration of FIG. 7.

Figure 3:
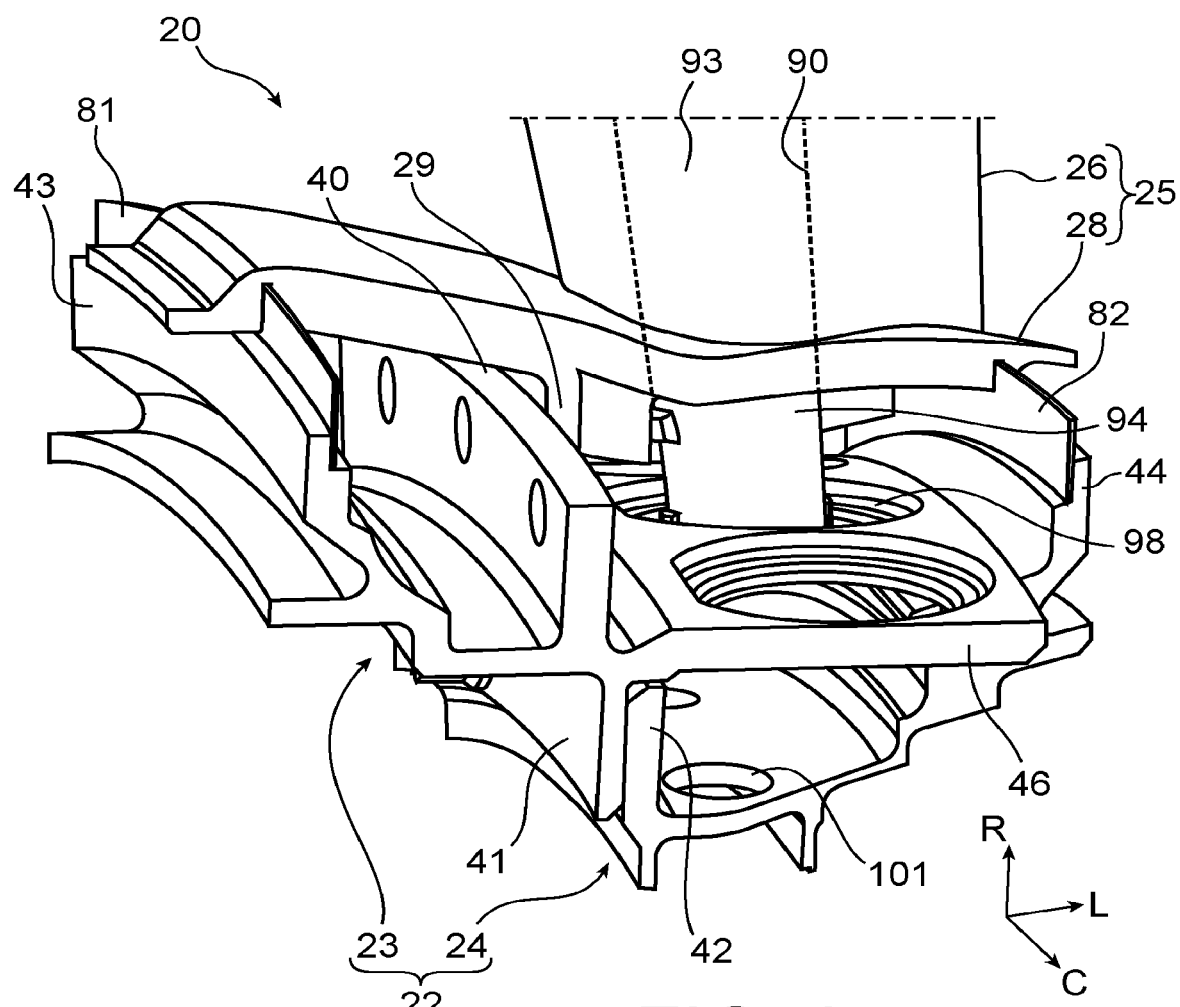
FIG. 3 is a schematic perspective view of a circumferential section of a lower portion of a turbine distributor comprising an inner shroud in accordance with said first embodiment.

From the configuration of FIG. 7, the second sealing member 82 is positioned in said second groove of the blades 25 and the downstream portion 24 of the inner shroud 22 is moved by axial translation relative to the blades 25 in a second direction S2 from downstream to upstream to reach the assembled configuration of FIG. 3.

With reference to FIGS. 2 and 3, the blade 25 shown in these figures has a hollow profile forming an inner housing 90 opening at a radially inner end and at a radially outer end of this blade 25.

In this example, a sleeve 91 made of metal material is disposed in the inner housing 90 of the blade 25 said sleeve substantially matching this inner housing 90.

With reference to FIG. 2, the sleeve 91 has a generally slender shape in the radial direction R.

The sleeve 91 comprises a radially outer end 92 forming a platform and a body 93 connected to the platform 92 and comprising, radially opposite the platform 92, an end 94 forming a radially inner end of this sleeve 91.

The body 93 of the sleeve 91 has a substantially flared shape in the radial direction R, having greater longitudinal L and circumferential C dimensions at the platform 92 than at the radially inner end 94.

This allows in particular to insert the sleeve 91 into the inner housing 90 of the blade 25 by radial translation in a direction extending from the outer shroud 21 to the inner shroud 22 of the distributor 20.

After insertion, the sleeve 91 is fixed to the outer shroud 21 by its platform 92, using fixing means 95 such as screws cooperating with connecting means such as threaded orifices (not shown) made in the outer shroud 21. The fixing means 95 pass through openings 96 made in the platform 92.

The relative dimensions of the inner housing 90 of the blade 25 and of the body 93 of the sleeve 91 are such that these parts can move relative to each other in the radial direction R under the effect of their differential thermal expansion.

In general, the inner housing 90 of the blade 25 thus delimits a radial channel configured to convey ventilation air from an outer annular cavity 74 extending radially outside the outer shroud 21 towards an inlet cavity 75 (see below).

In an embodiment not shown, the radial channel for conveying air has no sleeve so that the ventilation air conveyed in this radial channel contacts the inner housing 90 of the blade 25.

In the example of FIGS. 2 and 3, the radial channel comprises the sleeve 91 so that the ventilation air conveyed in this radial channel does not contact the inner housing 90 of the blade 25.

More specifically, the sleeve 91 comprises an orifice radially passing right through this sleeve 91 so as to open on the one hand at the platform 92 and on the other hand at the radially inner end 94. The shape of this orifice is substantially similar to the outer shape of the body 93 of the sleeve 91 and therefore to the shape of the inner housing 90 of the blade 25.

The body 93 of the sleeve 91 passes through an opening 97 of the outer shroud 21 (visible in FIG. 4) as well as the inner housing 90 of the blade 25 so that its platform 92 bears radially on an outer surface of the outer shroud 21, that its body 93 is housed in the inner housing 90 of the blade 25 and that its radially inner end 94 opens outside this inner housing 90 at the inner platform 28 of the blade 25.

With reference to FIGS. 2 and 3, the sleeve 91 is more precisely arranged so that its radially inner end 94 passes through an opening 98 made in said longitudinal section 46 of the upstream portion 23 of the inner shroud 22.

When assembling the distributor 20, before positioning the upstream portion 23 of the inner shroud 22 according to the configuration of FIG. 7, the sleeve 91 should be placed in a position wherein its end 94 is positioned radially outside relative to the radial position of the longitudinal section 46 of the upstream portion 23. The sleeve 91 can then be inserted into the inner housing 90 of the blade 25 until its end 94 passes through said opening 98 made in said longitudinal section 46.

In the assembled configuration, the ventilation air coming from the outer annular cavity 74 can thus be conveyed through the blade 25 into said third inner space 73 of the inner shroud 22, via the orifice made in the sleeve 91.

In this example, the longitudinal section 50 of the downstream portion 24 of the inner shroud 22 carries an injection member 100. The injection member 100 of FIG. 2 is a conventional nozzle injector.

The injection member 100 extends radially under the downstream portion 24 of the inner shroud 22.

The injection member 100 contains the aforementioned inlet cavity 75 and is configured to fluidly communicate this inlet cavity 75 with an inner cavity 76 delimited radially on the outside by the inner shroud 22.

The inlet cavity 75 is in fluid communication with said third inner space 73 of the inner shroud 22 through openings 101 made in the longitudinal section 50 of the downstream portion 24 of the inner shroud 22 (see FIG. 3).

In a manner known per se, the inner shroud 22 carries an abradable material 120 intended to cooperate with wipers 121 of the movable wheel 15 so as to form a downstream dynamic seal between the inner cavity 76 and the primary flow path 11A (see FIG. 2). The inner shroud 22 also carries an abradable material 122 intended to cooperate with wipers 123 of the movable wheel 16 so as to form an upstream dynamic seal between the inner cavity 76 and the primary flow path 11A.

In the example of FIG. 2, the abradable material 120 is carried by the downstream section 51 of the downstream portion 24 of the inner shroud 22, while the abradable material 122 is carried by a support 47 integral with the upstream portion 23 of the inner shroud 22.

Of course, the above description is in no way limiting.

Figure 8:
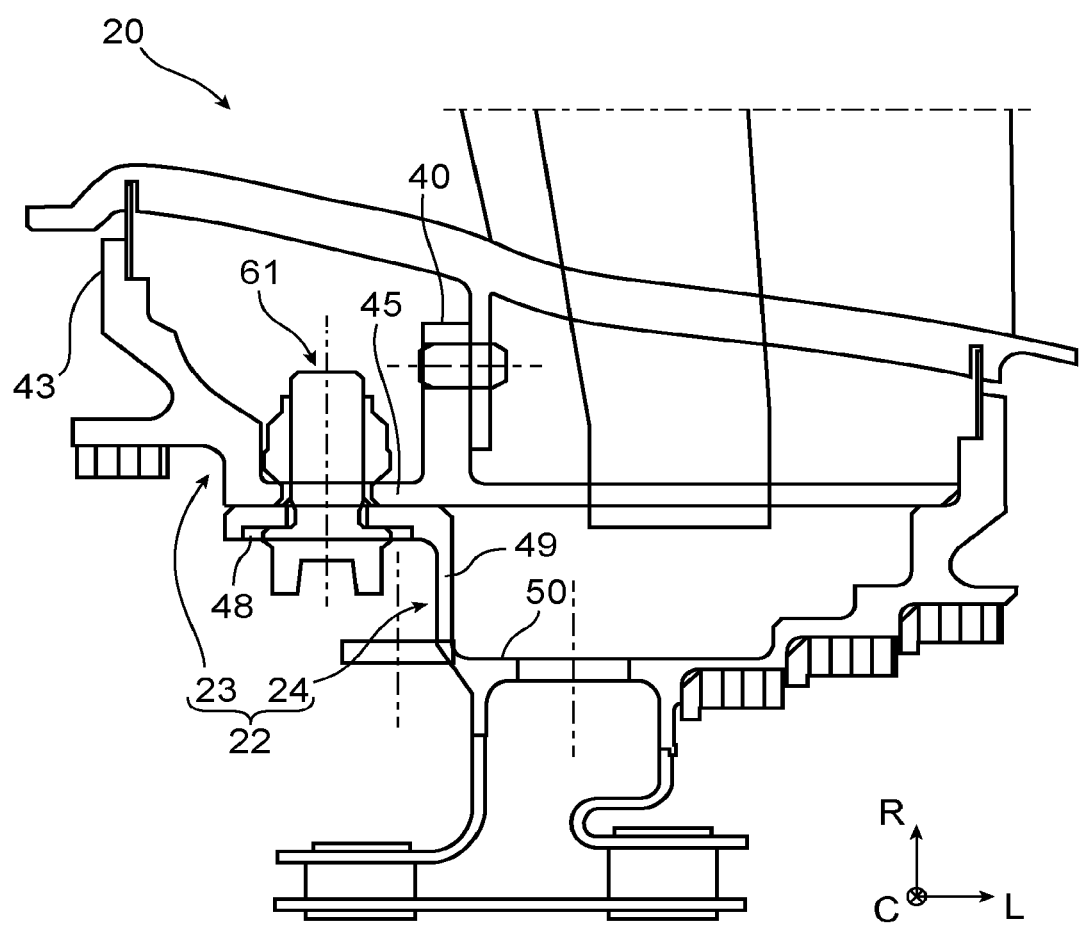
FIG. 8 is a schematic half-view in axial section of a lower portion of a turbine distributor comprising an inner shroud in accordance with a second embodiment of the invention.

For example, in the embodiment of FIG. 8, the upstream portion 23 and the downstream portion 24 of the inner shroud 22 are connected to each other by connecting portions extending longitudinally. Unlike the embodiment of FIG. 2, the connecting portion of the upstream portion 23 is in this example formed by said longitudinal section 45 connecting the radial arms 40 and 43 to each other, while the connecting portion of the downstream portion 24 is formed by an axial arm 48 connected to said upstream end of the longitudinal section 50 by a radial section 49.

Figure 9:
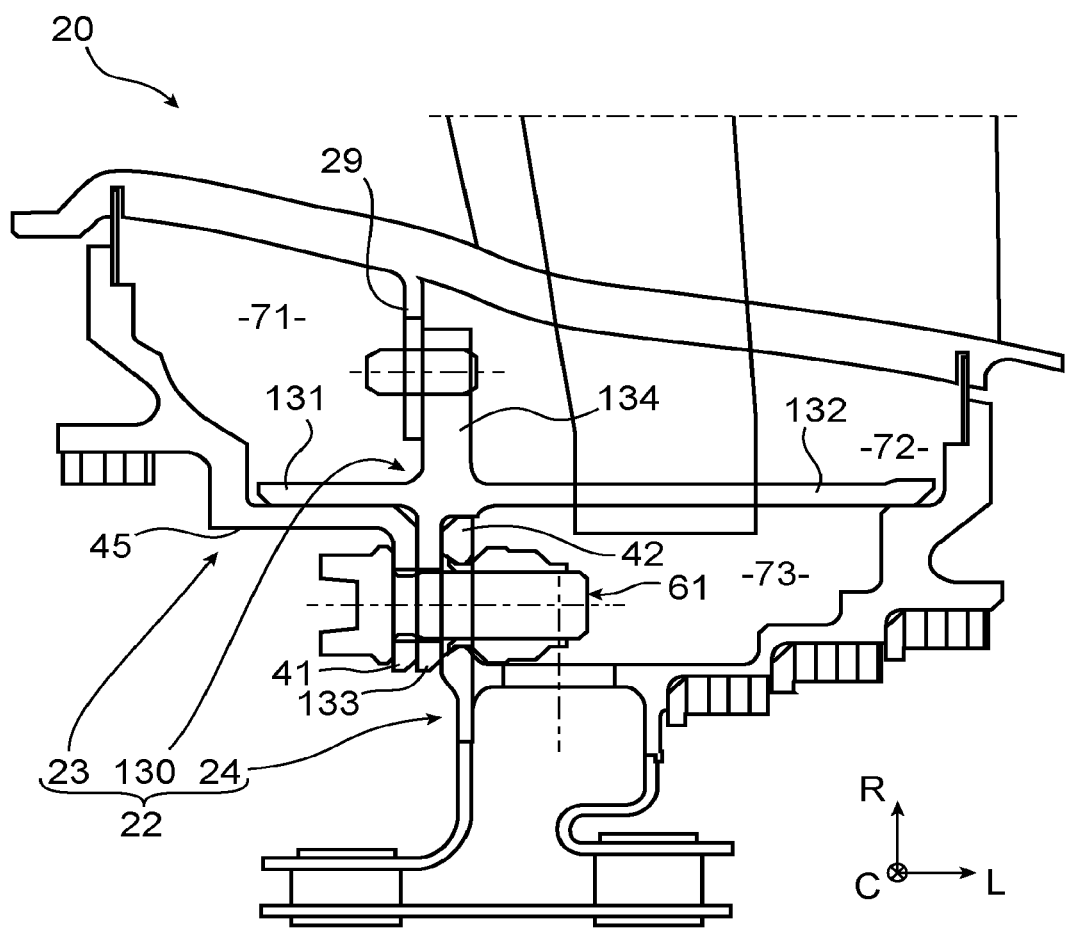
FIG. 9 is a schematic half-view in axial section of a lower portion of a turbine distributor comprising an inner shroud in accordance with a third embodiment of the invention.

Another embodiment is shown in FIG. 9. This embodiment differs essentially from that of FIG. 2 in that the inner shroud 22 comprises an intermediate portion 130 forming a part separate from each of the upstream 23 and downstream 24 portions.

The intermediate portion 130 is here annular.

In this example, the intermediate portion 130 comprises an upstream longitudinal section 131, a downstream longitudinal section 132, an inner radial arm 133 and an outer radial arm 134. In assembled configuration:

the upstream longitudinal section 131 bears against the longitudinal section 45 of the upstream portion 23 so as to delimit said first inner space 71 of the inner shroud 22 radially inwards, the downstream longitudinal section 132 is similar to the longitudinal section 46 of the upstream portion 23 of the distributor 20 of FIG. 2 the downstream longitudinal section 132 radially inwardly delimiting said second inner space 72 of the inner shroud 22 and radially outwardly delimiting said third inner space 73 of the inner shroud 22, the inner radial arm 133 is sandwiched between the radial arm 41 of the upstream portion 23 and the radial arm 42 of the downstream portion 24 so that the intermediate portion 130 is integral with the upstream 23 and downstream 24 portions, the outer radial arm 134 performs the same function as the radial arm 40 of the upstream portion 23 of the distributor 20 of FIG. 2, by connecting the inner shroud 22 to the radial arm 29 of the blade 25.

The invention claimed is:

1. A stator assembly for a turbomachine having a central longitudinal axis and comprising:

an outer shroud extending around said central longitudinal axis, an inner shroud concentric with the outer shroud, and a blade extending radially between the inner shroud and the outer shroud, the blade being connected to the inner shroud via a first connecting means, the blade delimiting a channel configured to convey ventilation air from a cavity extending radially outside the outer shroud to a cavity extending radially inside the inner shroud, wherein the inner shroud comprises an upstream portion and a downstream portion forming two parts separate from each other and extending respectively from an axially upstream side and from an axially downstream side of said first connecting means when said parts are in an assembled configuration, the upstream portion being configured to be placed, when assembling the inner shroud, in the assembled configuration by axial translation of said upstream portion relative to the blade in a first direction extending from said upstream side to said downstream side, the downstream portion being configured to be placed, when assembling the inner shroud, in the assembled configuration by axial translation of said downstream portion relative to the blade in a second direction extending from said downstream side to said upstream side, wherein the assembly further comprises second connecting means connecting the upstream portion and the downstream portion of the inner shroud to each other so as to maintain the upstream portion and the downstream portion in said assembled configuration, wherein both the upstream portion and the downstream portion delimit a main flow path for circulation of gases, and wherein the assembly further comprises a first sealing member integral with an upstream end of a radially inner platform of the blade and a second sealing member integral with a downstream end of the radially inner platform of the blade, the upstream portion of the inner shroud comprising a sealing face axially bearing on the first sealing member, the downstream portion of the inner shroud comprising a sealing face axially bearing on the second sealing member.

2. The assembly according to claim 1, wherein at least one of the upstream portion and the downstream portion of the inner shroud is annular.

3. The assembly according to claim 1, wherein each of the first and the second sealing member is a sealing tab extending circumferentially around the central longitudinal axis and having a radially outer portion housed in a respective groove of the radially inner platform of the blade and a radially inner portion forming a bearing face for said sealing face of the upstream and downstream portion respectively.

4. The assembly according to claim 1, wherein the second connecting means comprise bolts.

5. The assembly according to claim 1, wherein the second connecting means each extend either axially or radially.

6. The assembly according to claim 1, wherein the inner shroud comprises a connecting portion cooperating with a connecting portion of the blade, the first connecting means passing through the connecting portion of the inner shroud and the connecting portion of the blade so as to connect the inner shroud and the blade to each other.

7. The assembly according to claim 6, wherein the connecting portion of the inner shroud is formed by a radial arm of the upstream portion or of the downstream portion of said inner shroud.

8. The assembly according to claim 6, wherein the inner shroud comprises an intermediate portion forming a part separate from each of the upstream and downstream portions, said intermediate portion being fixed to the upstream and downstream portions when the latter are in said assembled configuration, the connecting portion of the inner shroud being formed by a radial arm of the intermediate portion of said inner shroud.

9. The assembly according to claim 1, wherein the inner shroud and the outer shroud each comprise a metal material and the blade comprises a ceramic matrix composite material.

10. A turbine of turbomachine, comprising an assembly according to claim 1.

11. A method for assembling an assembly according to claim 1, said method comprising a first step of assembling the blade with the outer shroud and a second step of assembling the inner shroud with the blade assembled with the outer shroud during the first step, the second step comprising an axial translation of the upstream portion in said first direction and an axial translation of the downstream portion in said second direction.

12. The assembly according to claim 1, wherein the first sealing member extends between an upstream radial arm integral with the upstream portion and the internal platform of the blade, and the second sealing member extends between a downstream radial arm integral with the downstream portion and the internal platform of the blade.

* * * * *